(12) United States Patent
Chintalapati et al.

(10) Patent No.: US 7,216,160 B2
(45) Date of Patent: May 8, 2007

(54) SERVER-BASED APPLICATION MONITORING THROUGH COLLECTION OF APPLICATION COMPONENT AND ENVIRONMENTAL STATISTICS

(75) Inventors: Murthy Chintalapati, Santa Clara, CA (US); Sreeram Duvvuru, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 989 days.

(21) Appl. No.: 09/999,646

(22) Filed: Oct. 31, 2001

(65) Prior Publication Data

US 2003/0084018 A1    May 1, 2003

(51) Int. Cl.
*G06F 15/173*    (2006.01)

(52) U.S. Cl. ................. 709/224; 709/227; 713/153; 370/352

(58) Field of Classification Search ............... 709/220, 709/224, 218, 223, 227, 228, 238; 717/2, 717/5; 714/26; 370/473, 352, 235; 713/153; 707/10

See application file for complete search history.

(56) References Cited

U.S. PATENT DOCUMENTS

| | | |
|---|---|---|
| 6,249,912 B1 | 6/2001 | Blandy |
| 6,263,361 B1 | 7/2001 | Hoyer et al. |
| 6,353,861 B1 * | 3/2002 | Dolin et al. ................ 719/318 |
| 6,611,498 B1 * | 8/2003 | Baker et al. ................ 370/252 |
| 6,615,262 B2 * | 9/2003 | Schweitzer et al. ......... 709/224 |
| 6,956,845 B2 * | 10/2005 | Baker et al. ................ 370/352 |
| 6,957,255 B1 * | 10/2005 | Schweitzer et al. ......... 709/223 |
| 6,963,912 B1 * | 11/2005 | Schweitzer et al. ......... 709/224 |
| 2002/0010757 A1 * | 1/2002 | Granik et al. ............... 709/218 |
| 2002/0143926 A1 * | 10/2002 | Maltz et al. ................ 709/224 |
| 2002/0143927 A1 * | 10/2002 | Maltz et al. ................ 709/224 |
| 2005/0041583 A1 * | 2/2005 | Su et al. ..................... 370/235 |

FOREIGN PATENT DOCUMENTS

WO    WO 00/38048 A2    9/2000

OTHER PUBLICATIONS

Murthy Chintalapati, et al., "Hosting Web Applications: Key Considerations for Service Providers", JavaOne, Sun's 2001 Worldwide Java Developer Conference, Jun. 7, 2001, pp. 1-32 (pp. 27-29 pertinent).
European Patent Office, "European Search Report," Application EP 02257177, 3 pages.
European Patent Office, Office Action for Application EP 02257177, dated Mar. 20, 2006, 4 pages.
Current Claims, Application EP 02257177, 10 pages (attached).

* cited by examiner

*Primary Examiner*—Khanh Dinh
(74) *Attorney, Agent, or Firm*—Hickman Palermo Truong & Becker LLP (57) ABSTRACT

Methods for monitoring an application running on a server are described. Method steps include maintaining counters of statistics related to operation of the application, collecting first operational statistics based on counters from one or more application components, collecting second operational statistics based on counters from one or more application runtime environment components, updating aggregation statistics based on the collected statistics, and storing the statistics for access by a presentation agent which can interface with external monitoring tools. The nature and level of the collected statistics provide valuable insight into the operation of the application of interest.

58 Claims, 4 Drawing Sheets

SERVER-BASED APPLICATION MONITORING THROUGH COLLECTION OF APPLICATION COMPONENT AND ENVIRONMENTAL STATISTICS

FIELD OF THE INVENTION

This invention relates generally to computer systems, and more particularly to a technique for monitoring an application running on a server by collecting operational statistics based on application components and runtime environment.

BACKGROUND

With the proliferation of the World Wide Web and the Internet, the demand for web content and web-based application services has increased dramatically. Consequently, the demand for robust, scalable, and manageable servers to serve the content and to service the application requests has also increased dramatically. The term "server" in this context is intended to generally mean the computer software that provides the logic to serve at least the needs for content and application services.

Web servers are employed by enterprises and service providers to serve content. The demand for web servers includes stringent requirements with respect to the serving of content and to the management of the server in order to meet the high network traffic demands. Furthermore, with the trend toward development and delivery of more and more dynamic content, often based on user input and requests, web servers are required to provide a platform for servicing requests for dynamic content. Servicing content requests on a web server often requires execution of applications on the web server, in order to accept and process user input and to respond accordingly.

Application servers are employed by many organizations, from organizations that want to maintain an e-commerce presence to organizations that are in the business of providing applications through a network, i.e., application service providers. The demands on application servers are also high, due to requirements with respect to developing, deploying, and managing the applications that run on the server. Furthermore, application servers are required to provide services to, and thus interact with, other servers, enterprise directory, database repositories, client software, and multiple device platforms. Additional challenges are present as a result of the increasing number of available computing platforms that can access an application server, such as hand-held computers, Internet appliances, and wireless devices.

Application servers allow IT departments to fully leverage their back-end resources, e.g., legacy applications, distributed systems databases, and even other Web-based content, and make them available to customer, partners, and employees over enterprise networks, and/or the public Internet Since applications are increasingly being run on web servers, and since applications running on application servers are requiring increasingly demanding functionality, a previously unmet need is recognized for leading-edge servers to provide a platform that serves the needs of application developers as well as server administrators. Application developers need to be able to monitor the loading and execution of their applications running on a server, during development, deployment, and the entire life-cycle of the application. Network, server, and service administrators, among others, need the capability to monitor applications running on their servers and networks. Furthermore, a previously unmet need is recognized for the ability to monitor applications at a certain level of operation, thus, to have an intimate knowledge of the application execution cycle. In order to efficiently and effectively monitor server-based applications, access to information about the execution of an application through standard or commonly used mechanisms is also needed.

SUMMARY OF THE INVENTION

In light of the challenges and demands discussed above, the present invention provides, in one aspect, a method and system for monitoring a server-based application through collection of application component statistics and runtime environmental statistics. Method steps include maintaining counters of statistics related to operation of the application, collecting first operational statistics based on counters from one or more application components, collecting second operational statistics based on counters from one or more application runtime environment components, updating aggregation statistics based on the collected statistics, and storing the statistics for access by a presentation agent which can interface with external monitoring tools. In one embodiment, the data is represented in Extensible Markup Language (XML) to facilitate accessibility over Internet.

In one embodiment, statistics are collected in aggregate form at the application level from a plurality of application components. In another embodiment, statistics are collected at the application component level. For example, the number of service hits, service exceptions, and service errors, as well as the average service time for each of a plurality of application components may be generated and collected.

In still another embodiment, the environmental statistics are collected from a class loader that manages the loading of application component classes, a data source facilitator that manages connections to an external data source during running of the application, and a session manager that manages user sessions during running of the application. For example, the number of times an exception was encountered indicating that a class was not found for loading, and the size of all of the application classes loaded by the class loader may be generated by and collected from the class loader. The maximum number of user sessions concurrently active, the number of new sessions created, and the number of times an attempt to create a session during running of the application may be generated by and collected from the session manager. The number of service connections for a specific connection pool to a data source, the time between a user request for a connection to a data source and the return of an established connection, and the number of rollbacks may be generated by and collected from a data source facilitator. The foregoing statistics are presented as examples only, for a more detailed description of statistics gathered by various embodiments of the invention is presented below.

In other aspects, the invention encompasses a computer apparatus, and a computer readable medium to carry out the foregoing.

BRIEF DESCRIPTION OF THE DRAWINGS

The present invention is illustrated by way of example, and not by way of limitation, in the figures of the accompanying drawings, in which like reference numerals refer to similar elements. Although the drawings are provided for purposes of illustrating example embodiments, the invention is not limited to the specific context shown in the drawings, in which.

DETAILED DESCRIPTION OF EMBODIMENTS

Overview

Methods for monitoring an application executing on a server are described which utilize the collection and presentation of detailed statistics related to the invocation and operation of applications and application components, in addition to statistics related to the surrounding infrastructure provided by the application runtime environment.

Gathering operational statistics at the application, application component, and runtime environment level, and making the statistics available in real-time, has many benefits. For example, by analyzing trend charts, service administrators can look for usage patterns, service response times, resource utilization patterns, resource bottlenecks, etc. Consequently, administrators can configure hardware and software with the enhanced knowledge provided by the statistical data. In addition, web servers and application servers increasingly allow dynamic resource allocating/resizing, either manually or through script code. The statistics collected through practice of the present invention contribute to these analytical and system administrative capabilities. Furthermore, application developers can utilize the detailed statistics to make more optimal design decisions about the application that they are developing.

Another useful benefit from the collection of these statistics is to utilize the statistics for maintaining service level agreements (SLA). The embodiments described could be integrated within an SLA tool. A final example of an advantage offered by the present invention is the compilation and use of historical operational data, base on the collected statistics, which can be used for server capacity planning purposes. The advantages and benefits described are presented for exemplary purposes only, and are not to limit the practice and use of the invention.

Operating Environment

Figure 1:
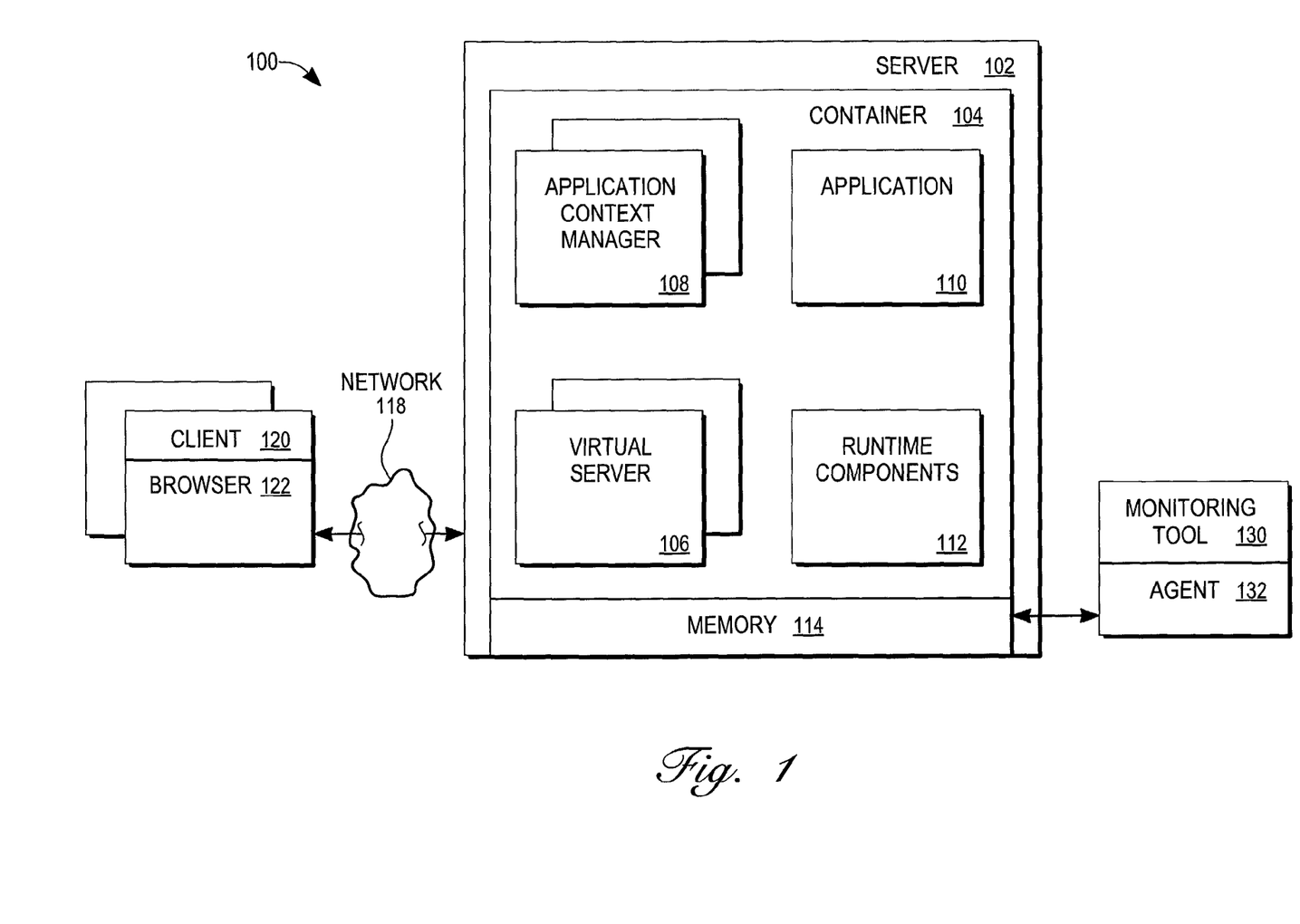
FIG. 1 is a block diagram illustrating an operating environment in which aspects of the present invention may be implemented.

FIG. 1 is a block diagram illustrating an operating environment 100 in which aspects of the present invention may be implemented. The operating environment 100 exemplified in FIG. 1 includes a server 102, which is generally a combination of computer hardware and software capable of executing instructions to perform tasks. For example, the server 102 may be an application server such as an iPlanet™ Application Server, or a web server such as an iPlanet™ Web Server, both available from Sun Microsystems, Inc. The server 102 includes a container 104, which provides a runtime environment for executing application components (see 204 of FIG. 2) and component interfaces (see 206 of FIG. 2) on the server 102. The container is described in more detail in reference to FIG. 2. An application component may be a servlet using Java™ Servlet technology, which provides a component-based, platform-independent method for building web-based applications that execute on a server. An application component interface may be a JavaServer Page™ (JSP), which utilizes an extension of the servlet technology to support authoring of HTML and XML pages, making it easier to combine fixed or static template data with dynamic content. JSPs are often used as the front end to a back end servlet, both running on a server such as server 102, to present information to a user wherein the dynamic information is typically provided by the servlet. At times herein, both application components 204 and application component interfaces 206 are referred to collectively as application components, without an identifying element number.

The container 104 includes one or more virtual servers 106, one or more application context managers 108, and runtime components 112. A virtual server 106 is typically implemented to run applications for a specific customer or user, or to support a specific e-commerce or application web site, and operates as a configurable, stand-alone server from the user's viewpoint. Each virtual server 106 can interoperate with more than one application context manager 108, whereby each application context manager 108 facilitates the execution of a single application. When an application context manager 108 receives an application service request, the context manager 108 provides instructions to the runtime components 112 and invokes a requested application 110. In addition, the server 102 includes a memory 114, which may be shared by multiple server instances running on a single server hardware platform, thus providing an efficient single location for the operational statistics maintained and collected by the embodiments described herein. Server instances are multiple executions of a server program running in its own process space, for redundancy and reliability purposes, all of which can utilize the shared memory 114. A container 104 exists within each of the server instances.

A user typically requests an application service from a client machine 120, via a web browser 122. Each client 120 may be any mechanism capable of communicating with the server 102, including but not limited to a computer running a browser program. The request is transmitted through a network 118 and received at the server 102. The client 120 may communicate with the server 102 using any suitable protocol, including but not limited to HTTP and IIOP. The network 118 may be a local area network or a wide area network such as the Internet, and may even be as simple as a direct connection. Any mechanism capable of facilitating communication between the client 120 and the server 102 may serve as the network 118.

At the server 102, a listener thread receives the service request, and establishes a connection with a container 104. The listener thread queues the connections for passing to worker threads, which service the connection, primarily through the virtual server 106 and application context manager 108. The worker threads are capable of processing whatever requests, events, and activities are received on those connections. For example, a worker thread works with the server 102 to identify to which virtual server 106 a particular service request belongs, and works with the container 104 to invoke the application service logic, which in turn determines whether the applicable application components (see 204 of FIG. 2) and component interfaces (see 206 of FIG. 2) are loaded and whether the application classes are current or require class reloading. The term thread is used herein to describe a processing resource needed to serve a particular service request, or in other words, to execute a series of instructions embodied in software code. A thread allows a program to know which user is being served as the program is alternately re-entered on behalf of different users.

There could be multiple simultaneous threads serving same or different application components.

Once service pre-processing is completed, for example, resource resolution and verification, the worker thread can then invoke the service function, i.e., load and initialize the applicable application components and component interfaces, and can execute the service logic of the application. Errors and exceptions can occur during loading and initializing the application components and interfaces. For example, an application component or interface may not be present, or the component or interface may not initialize, possibly due to the absence of a resource or service that is currently unavailable. In addition, there could be exceptions that occur during service execution, which may be recognized by an unexpected service time. For example, a database connection may be lost, or a user may not be authorized. These and other errors and exceptions are recognized and maintained, as described below.

The operating environment 100 exemplified in FIG. 1 may further include a monitoring tool 130, which typically includes an agent 132 for acting on behalf of an administrator, developer, or other entity monitoring execution of an application such as application 110. The invention is described herein as embodied within the server 102, primarily within the container 104. However, it should be noted that the invention is not so limited. Rather, the invention may be implemented in any type of operating environment and in any type of server or computer system which provides a platform for servicing application service requests, and in which there is interest in monitoring an application executing on such a platform.

Application Service Request and Application Invocation

Figure 2:
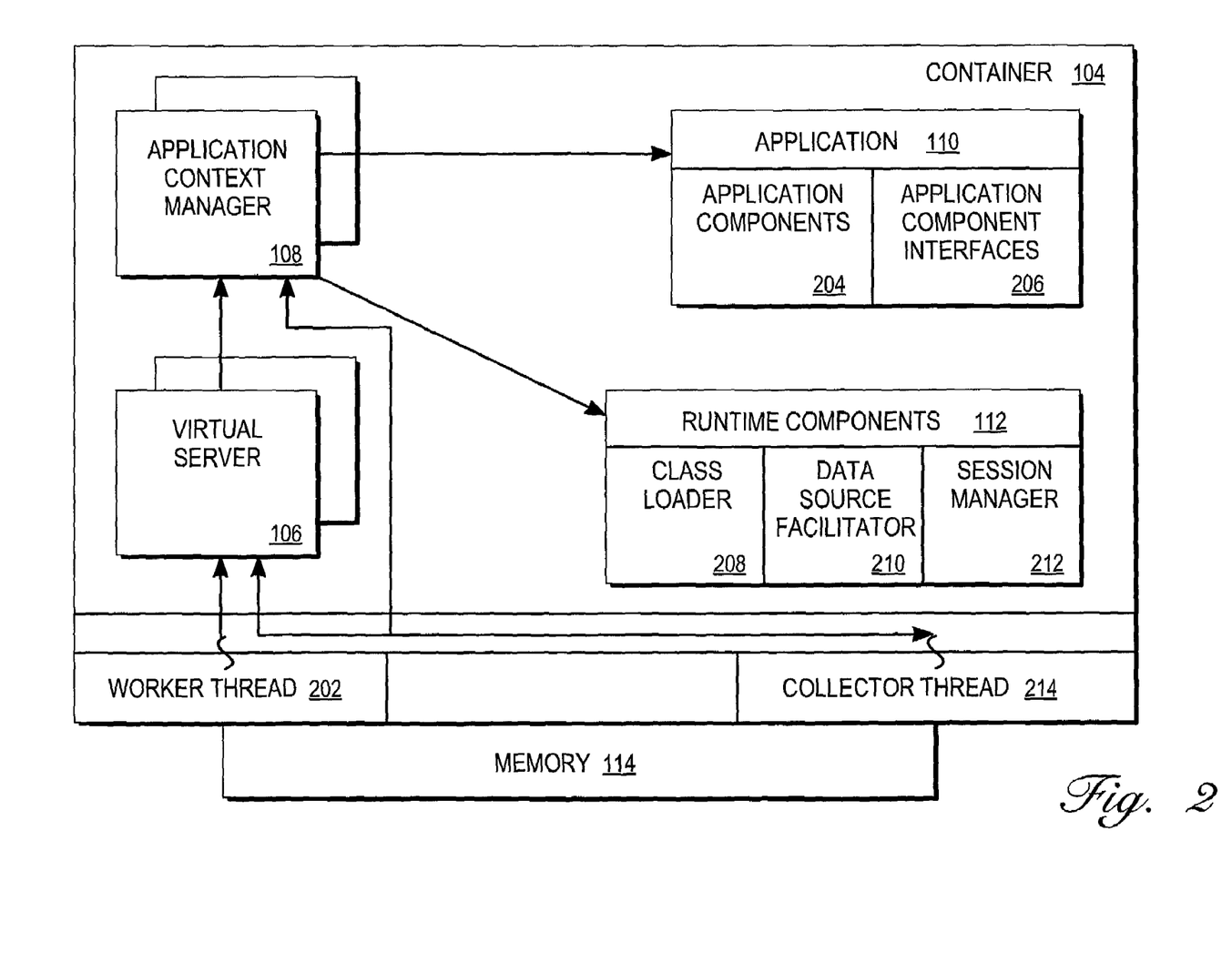
FIG. 2 is a block diagram illustrating a container, in which a method for monitoring an application running on a server may be implemented.

FIG. 2 is a block diagram illustrating a container 104, in which a method for monitoring an application running on a server can be implemented. The container 104 provides an environment for running applications, that is, it provides the infrastructure, resources, and external resource interface modules that an application requires to execute properly. For example, the container 104 can load the applicable application classes for instantiating and executing a requested application service; it can load database drivers upon an application making a database service request; and it can maintain and administer user sessions during execution of an application. A container 104 may be embodied in a module such as a Java Virtual Machine, but it is not so limited. The components depicted in container 104 include the virtual server 106, the application context manager 108, the application 110, and the runtime components 112, as described in reference to FIG. 1. FIG. 2 embellishes on the application 110 and the runtime components 112.

Once a user requests an application service, typically by invoking a Uniform Resource Locator (URL) through a browser 122 (FIG. 1) program, the server 102 (FIG. 1) identifies the requested application by mapping the URL to an application context. For example, consider the following URL: http:/Iserver.com/catalog/shoppingservlet. The "server.com" portion of the URL maps to a virtual server 106. The "/catalog/shoppingservlet" is termed request URI (Uniform Resource Identifier). The "catalog" portion of the URL is a context path which maps to an application named "catalog." The "shoppingservlet" portion of the request URI maps to an application component named "shoppingservlet." Once the server 102 resolves the URL to the appropriate application context, it can direct the container 104 to service the request, i.e., to invoke the application component identified in the URI. The container 104 provides the runtime, or execution time, environment for running the requested application. Thus, from the mapped request passed from the server 102, the application context manager 108 has the necessary information to deploy an instance of the application. In addition to mapping the URL to a resource, the server 102 performs numerous other tasks before passing control to the container 104, such as resource verification and allocation.

In one embodiment, it is the application context manager 108 that controls the maintenance of statistics for monitoring the execution of an application on the server 102. Statistics are maintained both at the virtual server 106 level for all applications running thereon, at the application level for all instances of the application, and at the application component level for components and component interfaces of an application instance.

Session Manager Statistics

Servicing an application request requires deployment of an instance of the application, which requires an invocation of the runtime components 112. Part of the task of servicing the request requires establishment and management of a user session, including making the session available for additional requests from the user. The context manager 108 interfaces with a session manager 212, which manages the user sessions associated with the application. Management of the user sessions includes, for example, keeping records of each user session associated with an application, freeing resources upon expired sessions, and maintaining user state information such that it is available upon a server crash and subsequent reboot.

Valuable statistics are available from the session manager 212. Therefore, during execution of a service request, the context manager 108 instructs a worker thread 202 to employ program logic to maintain counters of specified statistics related to the user sessions, via the session manager 212, and related to the application of interest. In one embodiment, the following statistics or data attributes are maintained by the session manager 212 at the request of the context manager 108, and can be encapsulated within the session manager 212:

countMaxSessions, defined as the maximum number of sessions concurrently active during running of the application 110;

countActiveSessions, defined as the number of sessions currently active;

countTotalSessions, defined as the number of new sessions created during running of the application 110;

countSessionCreationErrors, defined as the number of times an attempt to create a session failed (perhaps, but not necessarily, due to resource limitations) during running of the application 110;

countExpiredSessions, defined as the number of sessions that expired during running of the application 110;

countInvalidatedSessions, defined as the number of sessions that were explicitly invalidated during running of the application 110; and countUpdateExceptions, defined as the number of times the session update request failed during running of the application 110.

In addition, statistics are kept in relation to the session data store, which is the mechanism for maintaining user information in case of a server crash. The following data attributes are collected by the session manager 212 at the request of the context manager 108:

countLoads, defined as the number of times the session data store loaded session data during running of the application 110;

countStores, defined as the number of times the session data is saved to a data storage during running of the application 110;

countErrors, defined as the number of errors encountered by the session data store during running of the application 110;

countTotalBytesRead, defined as the number of data bytes read to the session data store during running of the application 110; and countTotalBytesWritten, defined as the number of data bytes written to the session data store during running of the application 110.

A process for collecting these statistics from the session manager 212, and storing them in memory 114 is described in reference to the section below entitled "Collection of Statistics."

Class Loader Statistics

Note again that a virtual server 106 can invoke more than one application context manager 108 and that each context manager 108 is associated with only one application. Thus, many users could be requesting the same application service through a single context manager 108. In order to instantiate the application, the application classes must be loaded so that a worker thread 202 can execute the objects associated with the application instance to service the request. Based on the context path and the associated application components 204 and component interfaces 206, the context manager 108 knows which classes need to be loaded to run the components 204 and component interfaces 206, including dependent classes resolved from a class path directory. Hence, the context manager 108 invokes a class loader 208 to load the appropriate classes into the container 104 in order to instantiate and execute them.

Valuable statistics are available from the class loader 208. Therefore, during execution of a service request, the context manager 108 instructs a worker thread 202 to employ program logic to maintain counters of specified statistics related to the loading of the application component classes, via the class loader 208, and related to the application of interest. In one embodiment, the following statistics or data attributes are maintained by the class loader 208 at the request of the context manager 108, and can be encapsulated within the class loader 208:

countClassNotFound, defined as the number of times that an exception was encountered indicating that an application class was not found for loading;

countClassCacheEntries, defined as the number of entries in the class loader's cache; and countClassCacheSize, defined as the size of all of the application classes loaded by the class loader.

A process for collecting these statistics from the class loader 208, and storing them in memory 114 is described in reference to the section below entitled "Collection of Statistics."

Data Source Statistics

In order to invoke a database service that may be required to run the application of interest, a connection to a database is necessary. The data source facilitator 210 operates to connect to the database, or other data source, and to manage the database drivers for the container 104. Due to the expense of database connections, the data source facilitator 210 may pool connections to the database. Hence, a single database connection can serve multiple processing threads and thus multiple application service requests. The connection pool logic creates a connection to the database and maintains the connection for additional service requests, in addition to maintaining current requests connecting and disconnecting from the connection pool.

Valuable statistics are available from the data source facilitator 210, in relation to the connection pools and in relation to database transactions executing to service a particular request. Therefore, during execution of an application service request, the context manager 108 instructs a worker thread 202 to employ program logic to maintain counters of specified statistics related to interactions with a database, via the data source facilitator 210, and related to the application 110 of interest. In one embodiment, the following statistics or data attributes are maintained by the data source facilitator 210 at the request of the context manager 108, with respect to specific database connection pools, and can be encapsulated within the data source facilitator 210:

id, which identifies a specific data source connection pool;

maxConnections, defined as the maximum number of connections allowed for the specific connection pool;

countActiveConns, defined as the number of current service connections for the specific connection pool;

countTotalNewConnsRequested, defined as the total number of connections created via the specific connection pool;

countConnWaitTimeMillis, defined as the time between a user request for a connection to the data source and the return from the specific connection pool of an established connection;

countConnUseTimeMillis, defined as the average time the specific connection pool was used;

countConnTimeouts, defined as the number of times connections via the specific connection pool timed-out, possibly but not necessarily for resource consolidation;

waitQueueLength, defined as the current number of users waiting for a connection, assuming that the specific connection pool has the maximum number of available connections currently in use; and countConnReestablished, defined as the number of times the specific connection pool had to reestablish a connection to the data source.

In addition, statistics are kept in relation to data source transactions with respect to data source service requests. The following data attributes are collected by the data source facilitator 210 at the request of the context manager 108:

countActiveTransactions, defined as the number of currently active sessions to the data source;

countTransactions, defined as the number of successful transactions completed with respect to the data source; and countRollbacks, defined as the number of rollbacks, which is an undoing of a partly completed database change when a database transaction is determined to have failed.

A process for collecting these statistics from the data source facilitator 210, and storing them in memory 114 is described in reference to the section below entitled "Collection of Statistics."

Aggregated Application Component Statistics

In addition to collecting statistics related to the processes performed by the runtime components 112, the techniques described also maintain and collect statistics related to the application 110. In one embodiment, statistics are gathered at an aggregated application component 204 level. In other words, statistics are gathered and compiled for all of the application components 204, in addition to for all of the application component interfaces 206.

According to one embodiment, a distinction between application components 204 and application component interfaces 206, is that application components 204 are executed directly (i.e., loaded, initialized, and passed for execution) whereas application component interfaces 206 are compiled prior to loading and subsequent execution. Thus, some of the statistics described below may appear redundant, but they are associated with different types of application components, which are processed and served differently. Hence, statistics referred to with the same descriptor (e.g., countLoaded, countDestroyed, etc.) are representing different information.

Valuable statistics are available from the application components 204 of application 110. Therefore, during execution of an application service request, the context manager 108 instructs a worker thread 202 to employ program logic to maintain aggregated counters of specified statistics related to the components 204 of the application 110 of interest. In one embodiment, the following statistics or data attributes are maintained at the request of the context manager 108, and can be stored within the container 104:

countDeployed, defined as the total number of application components 204 specified in the application deployment descriptor, or a similar file that specifies application configuration and deployment information;

countLoaded, defined as the number of application components 204 currently loaded into the container 104;

countDestroyed, defined as the number of application components 204 that have been destroyed during running of the application 110, possibly but not necessarily due to dynamic reconfiguration or resource cycling;

countLoadExceptions, defined as the number of exceptions encountered while trying to load an application component, i.e., an application component 204, during running of the application 110;

countInitExceptions, defined as the number of exceptions encountered while initializing an application component 204, during start up phase of the application 110 or when the component is requested and initialized for the first time during running of the application 100.

countServiceHits, defined as the number of application components 204 accessed during running of the application 110;

countServiceExceptions, defined as the number of exceptions encountered while an application component 204 is servicing a request during running of the application 110;

countServiceErrors, defined as the number of application components 204 that indicated protocol errors during running of the application 110;

countISBytesRead, defined as the number of bytes read by application components 204 during running of the application 110;

countOSBytesWritten, defined as the number of bytes written by the application components 204 during running of the application 110;

countFormAuthLoginSuccess, defined as the number of times an application component 204 authorization succeeded during running of the application 110;

countFormAuthLoginFailed, defined as the number of times an application component 204 authorization failed during running of the application 110; and avgServiceTime, defined as the average time to complete a service by application components 204 during running of the application 110.

A process for collecting these statistics from the container 104, and storing them in memory 114 is described in reference to the section below entitled "Collection of Statistics."

Furthermore, valuable statistics are available from the application component interfaces 206 of application 110. Application component interfaces 206 are typically employed as tools for presenting static and/or dynamic content from the server 102 to a user, wherein the dynamic content is provided by the application component 204. Therefore, during execution of an application service request, the context manager 108 instructs a worker thread 202 to employ program logic to maintain aggregated counters of specified statistics related to the component interfaces 206 of the application 110 of interest. As noted above, in one embodiment, component interfaces 206 are compiled prior to servicing requests, whereas application components 204 are served as is.

In one embodiment, the following statistics or data attributes are maintained at the request of the context manager 108, and can be stored within the container 104:

countLoaded, defined as the number of application component interfaces 206 currently loaded into the container 104;

countDestroyed, defined as the number of application component interfaces 206 that have been destroyed during running of the application 110, possibly but not necessarily due to dynamic reconfiguration or resource cycling;

countCompileExceptions, defined as the number of exceptions encountered while an application component interface 206 is compiled;

countInitExceptions, defined as the number of exceptions encountered while an application component interface 206 is initializing, during running of the application 110;

countServiceHits, defined as the number of application component interfaces 206 accessed during running of the application 110;

countServiceExceptions, defined as the number of exceptions encountered while an application component interface 206 is servicing a request during running of the application 110;

countServiceErrors, defined as the number of application component interfaces 206 that indicated protocol errors during running of the application 110; and avgServiceTime, defined as the average time to complete a service by application component interfaces 206 during running of the application 110.

A process for collecting these statistics from the container 104, and storing them in memory 114 is described in reference to the section below entitled "Collection of Statistics."

Per Application Component Statistics

In addition to collecting statistics related to the application component interfaces 206 and aggregated statistics related to the operation of application components 204, the techniques described also maintain and collect statistics separately for each application component 204 of the application 110.

Valuable statistics are available from each of the application components 204 of application 110. Therefore, during execution of an application service request, the context manager 108 instructs a worker thread 202 to employ program logic to maintain counters of specified statistics related to each of the components 204 of the application 110 of interest. In one embodiment, the following statistics or data attributes are maintained at the request of the context manager 108, and can be stored within the container 104:

componentPath, which identifies a specific application component 204 of interest;

countServiceHits, defined as the number of accesses to, or invocations of, a specific application component 204 during running of the application 110;

countServiceExceptions, defined as the number of exceptions encountered while a specific application component 204 is servicing a request during running of the application 110;

countServiceErrors, defined as the number of times a specific application component 204 indicated protocol errors during running of the application 110;

avgServiceTime, defined as the average time to complete a service by a specific application component 204 during running of the application 110.

A process for collecting these statistics from the container 104, and storing them in memory 114 is described in reference to the section below entitled "Collection of Statistics."

Collection of Statistics

The application context manager 108 is further configured with logic for periodically collecting the statistics that are maintained as described above. This feature could be implemented to allow a user to define the collection period. The mechanism for collecting the statistics is through a collector thread 214 that executes context manager 108 logic to invoke objects which execute methods for querying the various components that maintain the statistics. In one embodiment, the collector thread 214 can communicate with virtual server 106 to employ logic for collecting statistics.

In one embodiment, with respect to the session manager statistics, the context manager 108 utilizes an interface for querying the session manager 212. An interface is used because the context manager 108 is not maintaining the relevant statistics and the method of maintaining the session manager statistics is private to the session manager 108. Thus, the session manager 212 is treated as an external module and data collection is consequently through a public interface. The interface operates to invoke "get" methods for the various session manager statistics (described as "count" methods above), which execute to provide the current counter values.

Similarly, in one embodiment, with respect to the application component interface 206 statistics, the context manager 108 utilizes an interface for collecting the related data. The interface operates to invoke "get" methods for the various application component interface statistics (described as "count" methods above), which execute to provide the current counter values.

With respect to the per application component statistics, which are maintained in one or more objects that encapsulate the counter data, in one embodiment, a hash table is utilized to map application component, or servlet, paths to the associated object for a given data. The collector thread 214 invokes the object to execute the "get" methods, thus collecting the encapsulated data.

With respect to the data source statistics maintained by the data source facilitator 210, the class loader statistics maintained by the class loader 208, and the virtual server and aggregated application component statistics maintained by the container 104, the collector thread simply periodically executes context manager 108 logic to query the respective statistic-maintaining entities by invoking objects to execute associated "get" methods.

The foregoing data collection methods are described as embodiments of the invention, and are implementations in a particular operating environment. The scope of the invention is not limited to these collection implementations, for different operating environments may require different collection mechanisms.

Each time the statistics are collected as described above, aggregations of each of the statistics for each of the applications are updated based on the newly collected statistics, and are stored in memory 114. In one embodiment, the data is stored in fixed size buckets that are initialized during virtual server 106 initialization. Statistic presentation modules, or agents, employ a specified data structure in order to present the statistical data in a desired format. In one embodiment, a statsxml generator can extract the data from memory 114, and format the data in Extensible Markup Language (XML) format according to a document type definition so that external monitoring tools, such as monitoring tool 130 (FIG. 1), can understand and utilize the data. In another embodiment, a Simple Network Management Protocol (SNMP) Management Information Base (MIB), or agent, is utilized to extract and format the data such that it is accessible by a monitoring tool 130 through use of the associated protocol. The monitoring tools 130 can communicate with the agents via any suitable communication interface.

Method of Monitoring an Application Running on a Server

Figure 3:
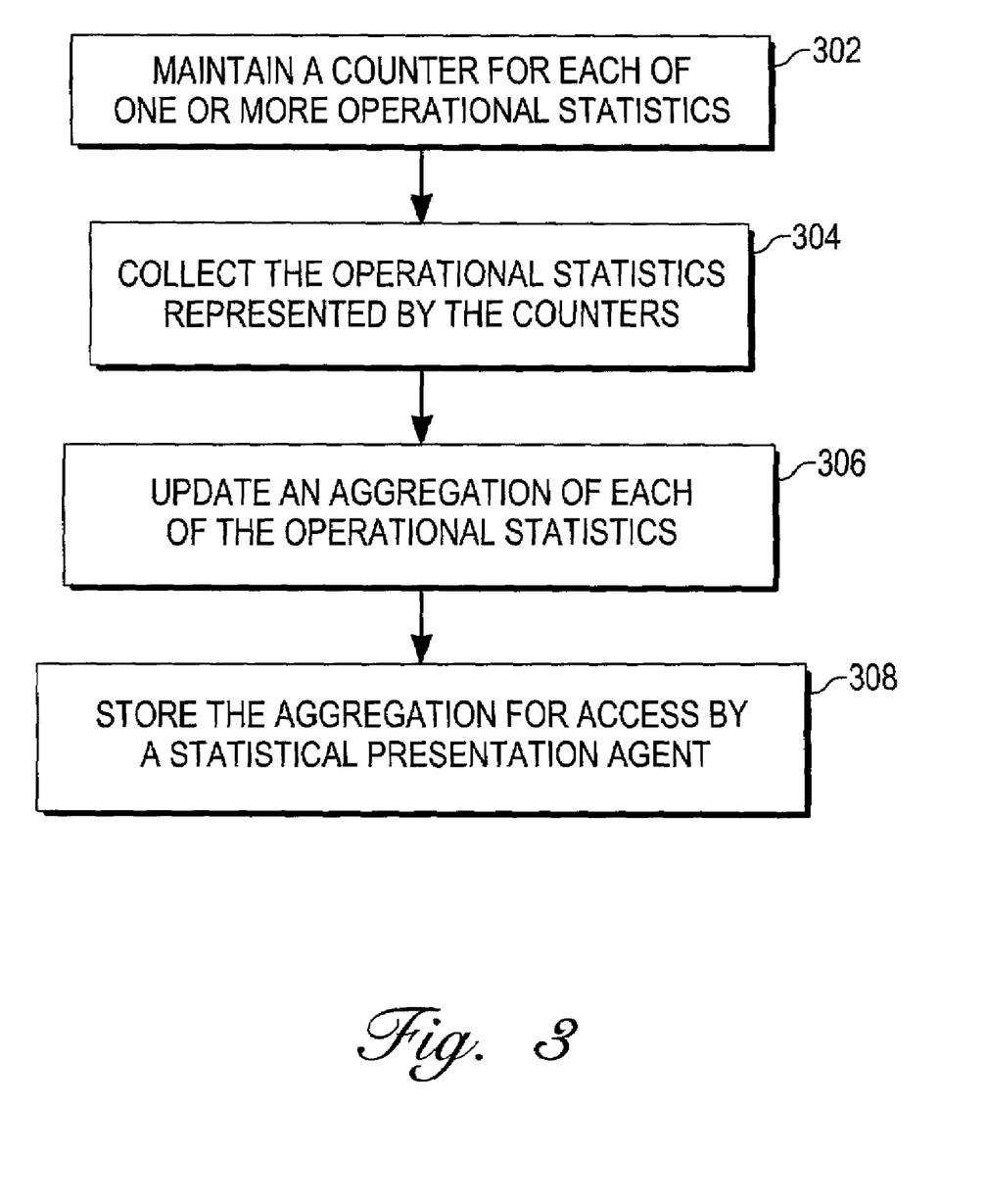
FIG. 3 is a flow diagram depicting a method of monitoring an application running on a server.

FIG. 3 is a flow diagram depicting a method of monitoring an application running on a server, according to embodiments of the invention. After an application service request is received, a URL associated with the service request is resolved to an application context path, which identifies the application being requested. For example, a service request may originate from a user working at a client computer 120 (FIG. 1), through a web browser 122 (FIG. 1), and is received by a listener thread at a server 102 (FIG. 1). Continuing with the example, the user may enter "http://server.com/catalog/shoppingservlet" which is resolved to identify "catalog" as the requested application service. Then, the requested application is invoked. Thus, the applicable component classes are loaded, instantiated, and associated methods executed.

At block 302, a counter for each operational statistic of interest is maintained. Specifically, one or more of the statistical data described above is maintained through use of counters. Application context manager 108 (FIG. 1) logic directs the application 110 (FIG. 1) and runtime components 112 (FIG. 1) to keep various counters of the statistical data of interest, as described above, while processing their portion of the application service request. At block 304, the operational statistics represented by the counters are collected from each of the respective application 110 and runtime components 112, for example, application components 204 (FIG. 2), application component interfaces 206 (FIG. 2), class loader 208 (FIG. 2), data source facilitator 210 (FIG. 2), and session manager 212 (FIG. 2). Collector thread 214 (FIG. 2) is utilized to run program logic for querying each of the statistic-maintaining components to extract the counter information. The collector thread 214 may communicate directly with the context manager 108 or may communicate through the virtual server 106 (FIG. 2). Furthermore, according to one embodiment, operational statistics are collected from a virtual server, such as virtual server 106, running within a runtime environment, such as container 104 (FIG. 2).

At block 306, an aggregation of each of the operational statistics for each of the statistic-maintaining components of application 110 (FIG. 1) and runtime components 112 (FIG. 1) is updated. Essentially, data representing the operational statistics, as maintained through counters, is pulled from memory 114 (FIG. 1) and updated based on the operational statistics collected at block 304. At block 308, the aggregated operational statistics updated at block 306 is stored in a memory, such as memory 114. The statistics are stored such that they are accessible to a statistical presentation agent, which in one embodiment, can interface with an external agent that is requesting the statistics. For example, the data may be structured according to an XML DTD (Data Type Definition) and thus accessible by an external monitoring tool agent, such as agent 132 (FIG. 1), communicating with the server 102 (FIG. 1).

The type of statistics gathered is described above by defining specific data gathered, which are embodied in an aspect of the invention. It is not intended to limit the invention to maintenance and collection of only the specific data described, for one may recognize a need for other data from similar application and environmental components that falls within the scope of the methods described. In addition, the statistic collection methods described above are provided as implementations in a particular environment, but it is not intended to limit the scope of the invention solely to such implementations. Other collection methods may be implemented in similarly functioning operating environments and still fall within the scope of the invention.

Hardware Overview

Figure 4:
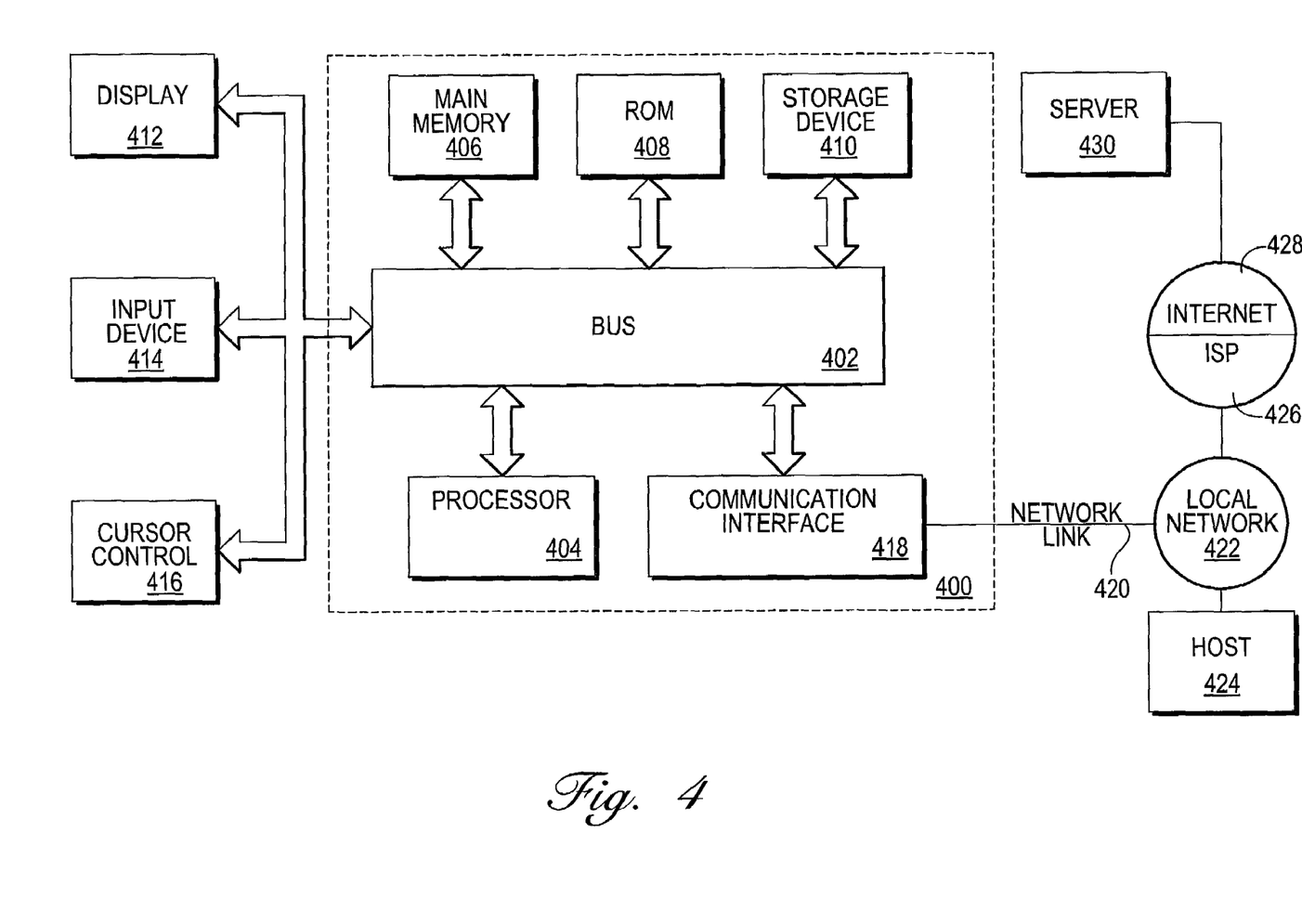
FIG. 4 is a block diagram of a computer system on which an embodiment of the invention may be implemented.

In one embodiment, the container 104 (FIG. 1) and application context manager 108 (FIG. 1) of the present invention and its various components are implemented as a set of instructions executable by one or more processors. FIG. 4 shows a hardware block diagram of a computer system 400 in which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk, optical disk, or magneto-optical disk, is provided and coupled to bus 1002 for storing information and instructions.

Computer system 400 may be coupled via bus 402 to a display 412, such as a cathode ray tube ("CRT") or a liquid crystal display ("LCD"), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for monitoring applications running on the system. According to embodiments of the invention, monitoring applications through collection of application and runtime environment components is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical, magnetic, or magneto-optical disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for monitoring server-based applications as described herein.

Processor 404 may execute the received code as it is received, and/or stored in storage device 410, or other non-volatile storage for later execution. In this manner, computer system 400 may obtain application code in the form of a carrier wave.

EXTENSIONS AND ALTERNATIVES

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

In addition, certain process steps illustrated by block diagrams are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method of monitoring an application running on a web server or an application server, the method comprising:
   maintaining a counter for each of one or more first operational statistics for one or more servlets running on the server;
   wherein the application is identified in application service requests via a corresponding context path portion of a Uniform Resource Identifier (URI);
   wherein the servlets are identified in application service requests via a corresponding application component portion of the Uniform Resource Identifier (URI) and invoked by an application context manager corresponding to the application and included in a virtual machine that provides a runtime environment for executing the one or more servlets;
   collecting, from the virtual machine, the one or more first operational statistics represented by the counters;
   wherein the first operational statistics that are collected include, for each of the one or more servlets:
   (a) a count of a number of times the servlet is invoked during execution of the application,
   (b) a count of a number of times an exception is encountered while the servlet is servicing requests during execution of the application,
   (c) a count of a number of service errors experienced by the servlet during execution of the application, and
   (d) an average amount of time the servlet is servicing requests during execution of the application;
   updating a first aggregation of each of the one or more first operational statistics for each of the one or more servlets based on the first operational statistics represented by the counters; and
   storing the first aggregation for access by a statistical presentation agent.

2. The method of claim 1 wherein the step of collecting the first operational statistics includes collecting statistics aggregated from two or more servlets.

3. The method of claim 1 further comprising:
   maintaining a counter for each of one or more third operational statistics for one or more virtual servers running an application on the server;
   wherein virtual servers are identified in application service requests via a virtual server portion of a corresponding Uniform Resource Locator (URL) of which the URI is part;
   collecting the one or more third operational statistics represented by the counters;
   updating a third aggregation of each of the one or more third operational statistics for each of the one or more virtual servers based on the third operational statistics represented by the counters; and
   storing the third aggregation for access by a statistical presentation agent.

4. The method of claim 1 further comprising:
   representing the first operational statistics for access by an external agent interfacing with the statistical presentation agent.

5. The method of claim 4 wherein the first operational statistics are represented in Extensible Markup Language (XML).

6. A method of monitoring an application running on a web server or
   an application server, the method comprising:
   maintaining a counter for each of one or more second operational statistics for one or more runtime components;
   wherein servicing an application request requires deployment of an instance of the application, which requires invocation of the runtime components;
   collecting, from a virtual machine that provides a runtime environment for executing the application on the server, the one or more second operational statistics represented by the counters;

wherein the second operational statistics that are collected include:

(a) statistics about loading of servlet and/or server page classes via a class loader that loads the classes into the container to instantiate and execute corresponding objects of the classes, including
 a count of a number of times that an exception was encountered indicating that an application class was not found for loading, and
 a count of a number of entries in the class loader's cache, (b) statistics about interactions with a data source involved with servicing application requests, including
 a count of a number of current service connections for a specific connection pool, and
 an amount of time between a user request for a connection to the data source and a return from the specific connection pool of an established connection, and (c) statistics about user sessions associated with the application, including
 a count of a number of sessions currently active,
 a count of a number of new sessions created during running of the application, and
 a count of a number of times an attempt to create a session failed during running of the application;

updating a second aggregation of each of the one or more second operational statistics for each of the one or more runtime environment components based on the second operational statistics represented by the counters; and storing the second aggregation for access by a statistical presentation agent.

7. The method of claim 6 wherein the step of collecting the second operational statistics includes collecting statistics from a session manager, the session manager operating to manage user sessions for running the application.

8. The method of claim 6 wherein the step of collecting the second operational statistics includes collecting statistics from a data source facilitator, the data source facilitator operating to facilitate a connection to a data source for running the application.

9. The method of claim 6 further comprising:
maintaining a counter for each of one or more third operational statistics for one or more virtual servers running an application, on the server;
collecting the one or more third operational statistic represented by the counters;
updating a third aggregation of each of the one or more third operational statistics for each of the one or more virtual servers based on the third operational statistics represented by the counters; and
storing the third aggregation for access by a statistical presentation agent.

10. The method of claim 6 further comprising:
representing the second operational statistics for access by an external agent interfacing with the statistical presentation agent.

11. The method of claim 10 wherein the second operational statistics are represented in Extensible Markup Language (XML).

12. A method of providing statistics related to execution of an application on a web server or an application server, the method comprising:

maintaining one or more counters of class loader statistics related to loading application classes for executing the application on the server;
maintaining one or more counters of data source statistics related to communications with a data source during execution of the application on the server;
maintaining one or more counters of session manager statistics related to application user sessions;
maintaining one or more counters of aggregated servlet statistics related to execution of the application on the server;
maintaining, for each of one or more servlets, one or more servlet statistics related to execution of the application on the server, wherein the one or more servlet statistics include:
 (a) a count of a number of times the servlet is invoked during execution of the application,
 (b) a count of a number of times an exception is encountered while the servlet is servicing requests during execution of the application,
 (c) a count of a number of service errors experienced by the servlet during execution of the application, and
 (d) an average amount of time the servlet is servicing requests during execution of the application;
maintaining one or more counters of server page statistics related to execution of the application on the server;
collecting the class loader statistics, the data source statistics, the session manager statistics, the aggregated servlet statistics, the servlet statistics, and the server page statistics; and
generating a structured presentation of the collected statistics.

13. The method of claim 12 wherein the step of maintaining one or more counters of class loader statistics includes maintaining a count of exceptions indicating that a class was not found during loading of the classes.

14. The method of claim 12 wherein the step of maintaining one or more counters of class loader statistics includes maintaining a count of entries stored in a class loader cache during loading of the classes.

15. The method of claim 12 wherein the step of maintaining one or more counters of class loader statistics includes maintaining a count of an aggregated size of the classes loaded by the class loader.

16. The method of claim 12 wherein the step of maintaining one or more counters of data source statistics includes maintaining a count of a current number of connections in a connection pool to the data source.

17. The method of claim 12 wherein the step of maintaining one or more counters of data source statistics includes maintaining a count of a maximum number of connections allowed in a connection pool to the data source.

18. The method of claim 12 wherein the step of maintaining one or more counters of data source statistics includes maintaining a count of a number of connections created to the data source via a specific connection pool.

19. The method of claim 12 wherein the step of maintaining one or more counters of data source statistics includes maintaining a count of an average time between a request for a connection to the data source and establishment of the connection.

20. The method of claim 12 wherein the step of maintaining one or more counters of data source statistics includes maintaining a count of an average use time of a connection to the data source.

21. The method of claim 12 wherein the step of maintaining one or more counters of data source statistics includes maintaining a count of a number of connections to the data source that have timed out.

22. The method of claim 12 wherein the step of maintaining one or more counters of data source statistics includes maintaining a count of a number of requests waiting for a connection to the data source.

23. The method of claim 12 wherein the step of maintaining one or more counters of data source statistics includes maintaining a count of a number of times a connection pool to the data source reestablished connection to the data source.

24. The method of claim 12 wherein the step of maintaining one or more counters of data source statistics includes maintaining a count of a number of active service transactions being serviced by the data source.

25. The method of claim 12 wherein the step of maintaining one or more counters of data source statistics includes maintaining a count of a number of service transactions successfully serviced by the data source.

26. The method of claim 12 wherein the step of maintaining one or more counters of data source statistics includes maintaining a count of a number of rollbacks performed by the data source, wherein a rollback is an operation to undo a partly completed change to the data source upon a data source transaction failure.

27. The method of claim 12 wherein the step of maintaining session manager statistics includes maintaining a count of a maximum number of sessions concurrently active during running of the application.

28. The method of claim 12 wherein the step of maintaining session manager statistics includes maintaining a count of a number of sessions currently active.

29. The method of claim 12 wherein the step of maintaining session manager statistics includes maintaining a count of a number of new sessions created during running of the application.

30. The method of claim 12 wherein the step of maintaining session manager statistics includes maintaining a count of a number of session creation failures during running of the application.

31. The method of claim 12 wherein the step of maintaining session manager statistics includes maintaining a count of a number of sessions that expired during running of the application.

32. The method of claim 12 wherein the step of maintaining session manager statistics includes maintaining a count of a number of sessions that were invalidated during running of the application.

33. The method of claim 12 wherein the step of maintaining session manager statistics includes maintaining a count of a number of failed session update requests during running of the application.

34. The method of claim 12 wherein the step of maintaining one or more counters of aggregated servlet statistics includes maintaining a count of a number of servlets specified in an application deployment description file.

35. The method of claim 12 wherein the step of maintaining one or more counters of aggregated servlet statistics includes maintaining a count of a number of servlets currently loaded.

36. The method of claim 12 wherein the step of maintaining one or more counters of aggregated servlet statistics includes maintaining a count of a number of servlets destroyed during running of the application.

37. The method of claim 12 wherein the step of maintaining one or more counters of aggregated servlet statistics includes maintaining a count of a number of exceptions experienced by the server while trying to load a resource during running of the application.

38. The method of claim 12 wherein the step of maintaining one or more counters of aggregated servlet statistics includes maintaining a count of a number of initialization exceptions experienced by the servlets during running of the application.

39. The method of claim 12 wherein the step of maintaining one or more counters of aggregated servlet statistics includes maintaining a count of a number of servlets invoked during running of the application.

40. The method of claim 12 wherein the step of maintaining one or more counters of aggregated servlet statistics includes maintaining a count of a number of exceptions experienced by the servlets during running of the application.

41. The method of claim 12 wherein the step of maintaining one or more counters of aggregated servlet statistics includes maintaining a count of a number of protocol errors experienced by the servlets during running of the application.

42. The method of claim 12 wherein the step of maintaining one or more counters of aggregated servlet statistics includes maintaining a count of a number of bytes read by the servlets during running of the application.

43. The method of claim 12 wherein the step of maintaining one or more counters of aggregated servlet statistics includes maintaining a count of a number of bytes written by the servlets during running of the application.

44. The method of claim 12 wherein the step of maintaining one or more counters of server page statistics includes maintaining a count of a number of server pages currently loaded.

45. The method of claim 12 wherein the step of maintaining one or more counters of server page statistics includes maintaining a count of a number of server pages destroyed during running of the application.

46. The method of claim 12 wherein the step of maintaining one or more counters of server page statistics includes maintaining a count of a number of initialization exceptions experienced by the server pages during running of the application.

47. The method of claim 12 wherein the step of maintaining one or more counters of server page statistics includes maintaining a count of a number of server pages invoked during running of the application.

48. The method of claim 12 wherein the step of maintaining one or more counters of server page statistics includes maintaining a count of a number of protocol errors experienced by a server page during running of the application.

49. The method of claim 12 wherein the step of maintaining one or more counters of server page statistics includes maintaining a count of an average time to complete a service by a server page during running of the application.

50. The method of claim 12 wherein the step of maintaining one or more counters of server page statistics includes maintaining a count of a number of exceptions encountered while compiling information during running of the application.

51. A computer-readable medium carrying one or more sequences of instructions for monitoring an application running on a web server or an application server, wherein execution of the one or more sequences of instructions by one or more processors causes the one or more processors to perform steps of:

maintaining a counter for each of one or more first operational statistics for one or more servlets running on the server;

wherein the application is identified in application service requests via a corresponding context path portion of a Uniform Resource Identifier (URI);

wherein the servlets are identified in application service requests via a corresponding application component portion of the Uniform Resource Identifier (URI) and invoked by an application context manager corresponding to the application and included in a virtual machine that provides a runtime environment for executing the one or more servlets;

collecting, from the virtual machine, the one or more first operational statistics represented by the counters;

wherein the first operational statistics that are collected include, for each of the one or more servlets
  (a) a count of a number of times the servlet is invoked during execution of the application,
  (b) a count of a number of times an exception is encountered while the servlet is servicing requests during execution of the application,
  (c) a count of a number of service errors experienced by the servlet during execution of the application, and
  (d) an average amount of time the servlet is servicing requests during execution of the application, updating a first aggregation of each of the one or more first operational statistics for each of the one or more servlets based on the first operational statistics represented by the counters; and storing the first aggregation for access by a statistical presentation agent.

52. A computer-readable medium carrying one or more sequences of instructions for monitoring an application running on a web server or an application server, wherein execution of the one or more sequences of instructions by one or more processors causes the one or more processors to perform steps of:

maintaining a counter for each of one or more second operational statistics for one or more runtime components;

wherein servicing an application request requires deployment of an instance of the application, which requires invocation of the runtime components;

collecting, from a virtual machine that provides a runtime environment for executing the application on the server, the one or more second operational statistics represented by the counters;

wherein the second operational statistics that are collected include:
  (a) statistics about loading of servlet and/or server page classes via a class loader that loads the classes into the container to instantiate and execute corresponding objects of the classes, including
    a count of a number of times that an exception was encountered indicating that an application class was not found for loading, and
    a count of a number of entries in the class loader's cache,
  (b) statistics about interactions with a data source involved with servicing application requests, including
    a count of a number of current service connections for a specific connection pool, and
    an amount of time between a user request for a connection to the data source and a return from the specific connection pool of an established connection, and
  (c) statistics about user sessions associated with the application, including
    a count of a number of sessions currently active,
    a count of a number of new sessions created during running of the application, and
    a count of a number of times an attempt to create a session failed during running of the application;

updating a second aggregation of each of the one or more second operational statistics for each of the one or more runtime environment components based on the second operational statistics represented by the counters; and storing the second aggregation for access by a statistical presentation agent.

53. A computer-readable medium carrying one or more sequences of instructions for monitoring an application running on a web server or an application server, wherein execution of the one or more sequences of instructions by one or more processors causes the one or more processors to perform steps of:

maintaining one or more counters of class loader statistics about loading of servlet and/or server page classes via a class loader that loads the classes into a container to instantiate and execute corresponding objects of the classes, including
  a count of a number of times that an exception was encountered indicating that an application class was not found for loading, and
  a count of a number of entries in the class loader's cache;

maintaining one or more counters of data source statistics about interactions with a data source involved with servicing application requests, including
  a count of a number of current service connections for a specific connection pool, and
  an amount of time between a user request for a connection to the data source and a return from the specific connection pool of an established connection;

maintaining one or more counters of session manager statistics about user sessions associated with the application, including
  a count of a number of sessions currently active,
  a count of a number of new sessions created during running of the application, and
  a count of a number of times an attempt to create a session failed during running of the application;

collecting the class loader statistics, the data source statistics, and the session manager statistics; and generating a structured presentation of the collected statistics.

54. The computer readable medium of claim 53, wherein execution of the one or more sequences of instructions by one or more processors causes the one or more processors to perform the specified action by causing the one or more processors to perform the steps of:

maintaining one or more counters of aggregated servlet statistics related to execution of the application on the server;

maintaining, for each of one or more servlets, one or more counters of servlet statistics related to execution of the application on the server;

maintaining one or more counters of server page statistics related to execution of the application on the server;

collecting the aggregated servlet statistics, the servlet statistics, and the server page statistics; and generating a structured presentation of the collected statistics.

55. A computer apparatus comprising:
a network interface;
a memory; and
one or more processors connected to the network interface and the memory, the one or more processors configured for
collecting first operational statistics from and about one or more servlets executing on a web server or an application server;
wherein the first operational statistics that are collected include, for each of the one or more servlets:
 a count of a number of times the component is invoked during execution of the application,
 a count of a number of times an exception is encountered while the component is servicing requests during execution of the application,
 a count of a number of service errors experienced by the component during execution of the application, and
 an average amount of time the component is servicing requests during execution of the application,
collecting second operational statistics from and about one or more application runtime environment components for executing the servlets on the server, the runtime environment components facilitating processing of the application service request;
wherein the second operational statistics that are collected include:
 statistics about loading of application component classes via a class loader that loads the classes into the container to instantiate and execute corresponding objects of the classes,
 statistics about interactions with a data source involved with servicing application requests, and
 statistics about user sessions associated with the application; and
storing the first and second operational statistics.

56. A computer apparatus comprising:
a network interface;
a memory; and
one or more processors connected to the network interface and the memory, the one or more processors configured for
maintaining one or more counters of class loader statistics associated with loading application component classes for executing the application on a web server or an application server;
maintaining one or more counters of data source statistics related to communications with a data source during execution of the application on the server;
maintaining one or more counters of session manager statistics associated with application user sessions;
maintaining one or more counters of aggregated servlet statistics related to execution of the application on the server;
maintaining, for each of one or more servlets, one or more servlet statistics related to execution of the application on the server, wherein the one or more servlet statistics include:
 (a) a count of a number of times the servlet is invoked during execution of the application,
 (b) a count of a number of times an exception is encountered while the servlet is servicing requests during execution of the application,
 (c) a count of a number of service errors experienced by the servlet during execution of the application, and
 (d) an average amount of time the servlet is servicing requests during execution of the application;
maintaining one or more counters of server page statistics related to execution of the application on the server;
collecting the class loader statistics, the data source statistics, the session manager statistics, the aggregated servlet statistics, the servlet statistics, and the server page statistics; and
generating a structured presentation of the collected statistics.

57. A method of monitoring an application running on a web server or
an application server, the method comprising:
receiving an application service request;
resolving a uniform resource locator associated with the application service request to an application context path identifying the application;
invoking the application to execute on the server;
maintaining a counter for each of one or more operational statistics for one or more servlets executing on the server;
collecting the one or more operational statistic represented by the counters;
wherein the operational statistics that are collected include, for each of the one or more servlets
 a count of a number of times the servlet is invoked during execution of the application,
 a count of a number of times an exception is encountered while the servlet is servicing requests during execution of the application,
 a count of a number of service errors experienced by the servlet during execution of the application, and
 an average amount of time the servlet is servicing requests during execution of the application,
updating an aggregation of each of the one or more operational statistics for each of the one or more servlets based on the operational statistics represented by the counters; and
storing the aggregation for access by a statistical presentation agent.

58. A method of monitoring an application running on a web server or
an application server, the method comprising:
receiving an application service request;
resolving a uniform resource locator associated with the application service request to an application context path identifying the application; invoking the application to execute on the server;
maintaining a counter for each of one or more operational statistics for one or more runtime components;
collecting, from a virtual machine that provides a runtime environment for executing the application on the server, the one or more operational statistic represented by the counters;
wherein the operational statistics that are collected include:
 statistics about loading of servlet and/or server page classes via a class loader that loads the classes into the container to instantiate and execute corresponding objects of the classes, including a count of a number of times that an exception was encountered indicating that an application class was not found for loading, and a count of a number of entries in the class loader's cache, statistics about interactions with a data source involved with servicing application requests, including a count of a number of current service connections for a specific connection pool, and an amount of time between a user request for a connection to the data source and a return from the specific connection pool of an established connection, and statistics about user sessions associated with the application, including a count of a number of sessions currently active, a count of a number of new sessions created during running of the application, and a count of a number of times an attempt to create a session failed during running of the application;

updating an aggregation of each of the one or more operational statistics for each of the one or more runtime environment components of the application based on the operational statistics represented by the counters; and storing the aggregation for access by a statistical presentation agent.

* * * * *